Figure 1:
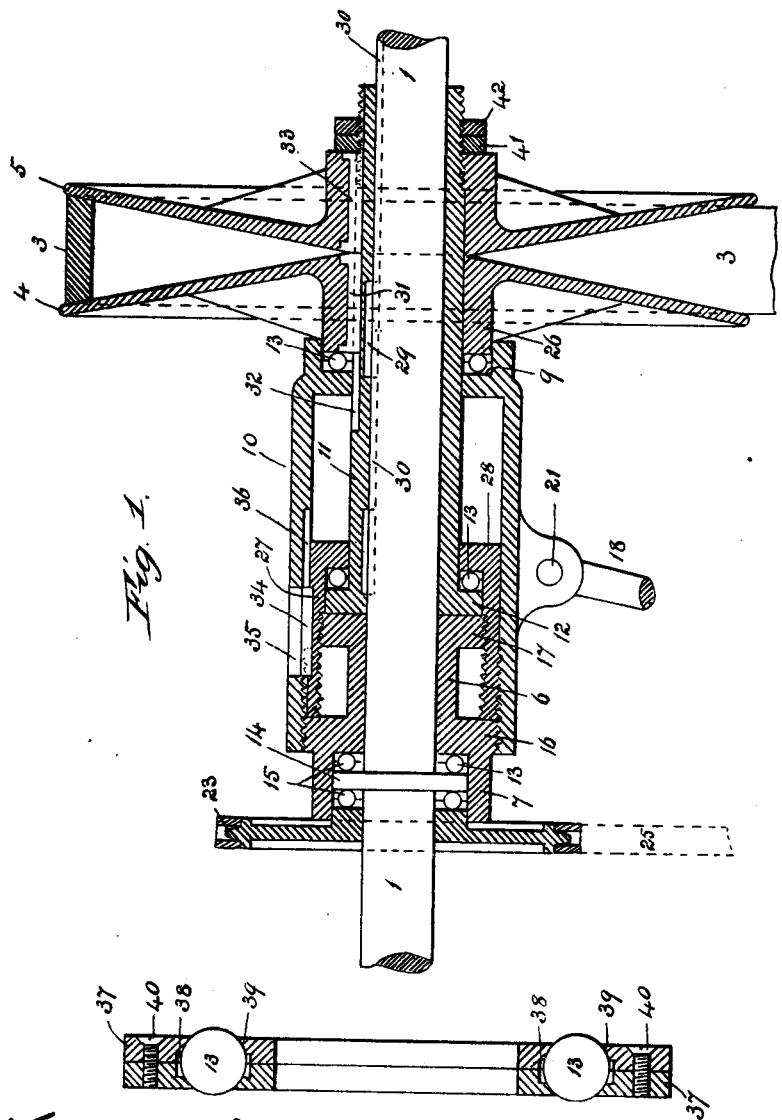
Figure 2:
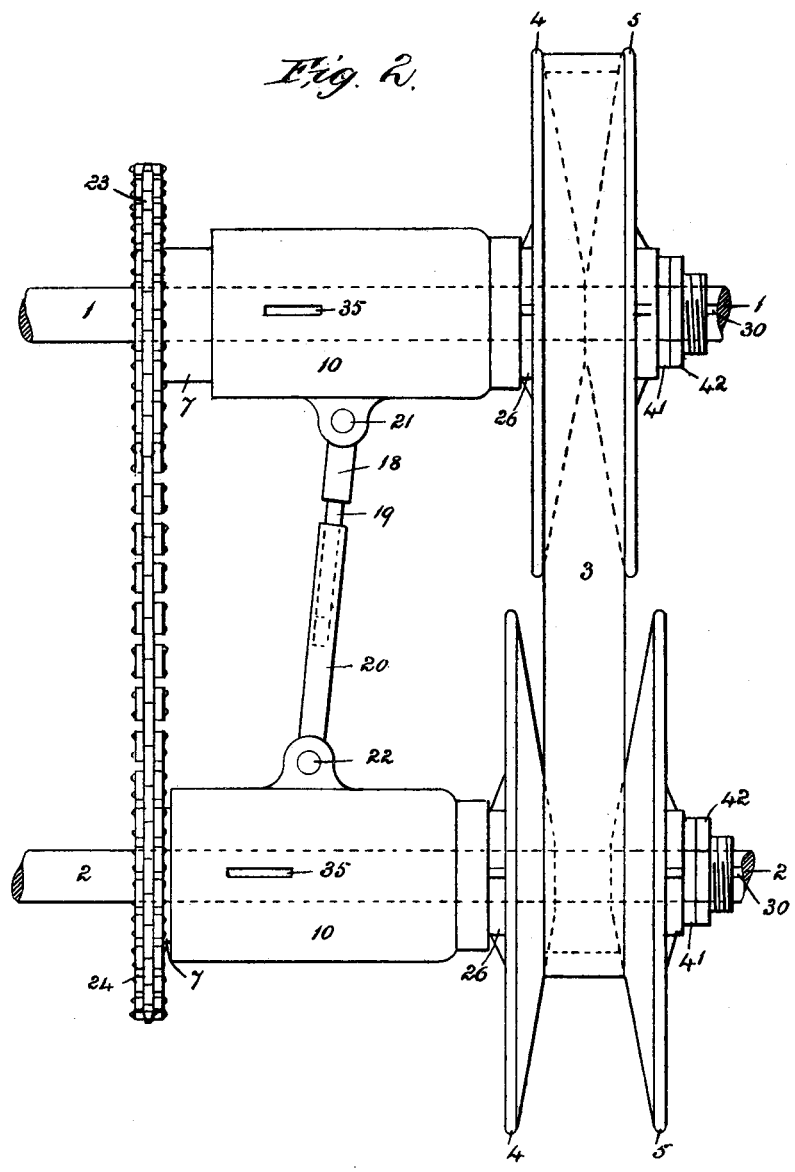

No. 676,077. Patented June 11, 1901.
C. H. OLIVERSON & F. W. KILLINGBECK.
SPEED VARYING APPARATUS.
(Application filed Aug. 23, 1899.)
(No Model.)
2 Sheets—Sheet 1.

No. 676,077. Patented June 11, 1901.
C. H. OLIVERSON & F. W. KILLINGBECK.
SPEED VARYING APPARATUS.
(Application filed Aug. 23, 1899.)
(No Model.) 2 Sheets—Sheet 2.

UNITED STATES PATENT OFFICE.

CHRISTOPHER HERBERT OLIVERSON AND FRANCIS WILLIAM KILLINGBECK, OF SOUTHPORT, ENGLAND.

SPEED-VARYING APPARATUS.

SPECIFICATION forming part of Letters Patent No. 676,077, dated June 11, 1901.

Application filed August 23, 1899. Serial No. 728,166. (No model.)

*To all whom it may concern:*

Be it known that we, CHRISTOPHER HERBERT OLIVERSON and FRANCIS WILLIAM KILLINGBECK, subjects of the Queen of Great Britain, and residents of Southport, in the county of Lancaster, England, have invented certain new and useful Improvements in or Connected with Speed-Varying Apparatus, of which the following is a specification.

Our invention is designed with the purpose of transmitting power where the relative speeds of a driving-shaft and a driven shaft require variation, and is particularly applicable to motor-cars, although it may be applied to any machinery where variable speeds, as aforesaid, are required.

In our invention we use pulleys of a type in which each pulley is formed by a pair of disks each dished to form a cone on one of its faces, the coned faces of these disks forming a V, (in half-section.) In the V thus formed a belt is fitted having its driving-surface at its edges instead of on the inner face of the belt. The working surfaces of pulleys of this type are varied in diameter by the forcing apart of the disks, with a resulting expansion of the V or the drawing together of the disks, with a resulting contracting of the V by means of suitable devices.

Our invention consists, mainly, in the actuating mechanism of special construction, to be hereinafter described, by means of which the drawing together of the coned disks is accomplished and in the use of the thrust of the belt by means of which the forcing apart of the coned disks is brought about.

In order that our invention may be more readily understood, drawings are appended hereto illustrating a specific form thereof.

In the drawings, Figure I is a longitudinal section of a pulley constructed in accordance with our invention. Fig. II is an elevation showing two pulleys connected by a belt, one mounted on a driving-shaft 1 and the other on a driven shaft 2. Fig. III is a detail section showing a cage in which the bearing-balls are held.

In the drawings similar numerals of reference indicate similar parts.

A sleeve 11, mounted with a feather-key 29 on the shaft 1, which is provided with a keyway 30 to allow of a longitudinal movement of the sleeve, carries two coned disks 4 and 5. One of these disks 4 is keyed with a feather-key 31 on the sleeve, which is provided with a keyway 32 to allow of longitudinal movement thereon, and the other coned disk 5 is also keyed at 33 to the sleeve 11 and secured and adjusted by the lock-nuts 41 and 42. Abutting against a flange 12 on the sleeve 11 is a second sleeve 6 with threaded flanges or collars 16 and 17. The thread on flange 16 is a right-handed thread and that on flange 17 a left-handed thread, or vice versa. This second sleeve 6 is enlarged at 7 and hollowed to receive a collar 14, which forms part of or is rigidly attached to the shaft 1. A sprocket or chain wheel 23 is rigidly attached to the sleeve 6. Another sleeve 10 surrounds the sleeves 11 and 6 and is recessed at one end 9 to receive a boss 26 on the coned disk 4. At the other end this sleeve is threaded with a female thread to correspond with the male thread on the flange 16. An inner bushing or sleeve 27 is fitted inside the sleeve 10 and around the flanges 17 and 12 of the sleeves 6 and 11. This bushing or sleeve is provided with a female thread in which the male thread on the flange 17 fits. The end 28 of the bushing 27 is in the form of a flange, between which and the flange 12 balls are fitted to reduce friction. Balls are also fitted at 15 on either side of the shaft-collar 14. The bearing-balls 13 we prefer to inclose in a cage (see Fig. III) which consists of a pair of disks 37, held together by screws 40. The bearing-balls are held in the grooves 38 and project through countersunk holes 39 beyond the faces of the cage. This arrangement allows of the assembling of the bearing-balls before they are placed between their bearing-surfaces.

Angular movement of the sleeve 27 on the axis of the shaft 1 and relatively to the sleeve 10 is prevented by a key 34, which is dropped through an opening 35 in the sleeve 10, and longitudinal movement is allowed by the keyway 36. The coned disks 4 and 5 and the actuating mechanism (shown in elevation on shaft 2, Fig. II) are with the exception of the male and female threads on flanges 16 and 17 similar to those on the shaft 1. The male and female threads on flanges 16 and 17 are in this case the reverse of the others, for a reason which will appear in the description of the method of operating our invention.

To prevent the angular movement of the sleeves 10, they are connected by a telescopic rod 18 19 20, pivoted at either end 21 and 22 to lugs forming part of the sleeve 10.

The sprocket-wheels 23 and 24, which are for convenience shown only diagrammatically in Fig. II, are connected by a chain 25 (also shown by dotted lines only) and the two pulleys by a belt 3.

In the position of the respective pulleys in the drawings that on shaft 1 is shown with the belt 3 occupying the working surface forming its largest diameter, while in that on shaft 2 the belt is occupying the working surface forming the smallest diameter of the pulley.

To reduce the speed, (1 being considered the driving-shaft and 2 the driven shaft,) it is necessary to reduce the diameter of the working surface of the pulley on shaft 1 and correspondingly increase that of the pulley on shaft 2. To accomplish this, the sprocket or chain wheel 23 is turned clockwise, transmitting its movement to the male threads on flanges 16 and 17 through the sleeve 6. These threads, working in their corresponding female threads in sleeves 10 and 27, the threads being respectively right and left handed, convey to the sleeves 10 and 27 a longitudinal movement, to the left in the case of sleeve 10 and to the right in the case of sleeve 27. The end 9 of the sleeve 10 (on shaft 1) thus leaves boss 26 on disk 4, allowing the thrust of the belt to impart a movement to the disk 4 to the left corresponding with the movement of the sleeve 10. The flange 28 of the sleeve 27 is similarly moved by the thread on flange 17, but to the right, away from the flange 12, when owing to the thrust of the belt a movement to the right is imparted to the disk 5, which also carries with it the sleeve 11 and flange 12. The two disks are thus moved apart, so as to expand the V. Simultaneously the angular movement of the sprocket-wheel 23 is conveyed by the chain 25 to the sprocket-wheel 24. The threads on the flanges 16 and 17 in this case being of the reverse hand, respectively, as hereinbefore mentioned, the sleeves 10 and 27 receive a reverse movement—that is, 10 is moved to the right and 27 to the left. The end 9 of the sleeve 10 imparts its right-hand movement to the disk 4, pushing or forcing it to the right. In a similar manner the flange 28, acting on the flange 12 through the balls shown, draws the sleeve 11, and with it the disk 5, to the left, thus producing a contraction of the V. By reversal of the movement of the sprocket-wheels and chain the reverse effect is obtained.

The belt accommodates itself to the changed positions with the effect that the diameter of the working surfaces of the two pulleys are respectively decreased and increased and a corresponding variation in speed is obtained. It is also evident that the two pulleys may be placed at considerable distances apart, in which case instead of connecting the two sleeves 10 by the telescopic rod, as hereinbefore described, each sleeve may, for example, be provided with a similar telescopic rod, which may be pivoted at one end to the sleeve 10 and at the other to any conveniently-fixed object.

We desire it to be understood that we do not limit ourselves to the specific construction hereinbefore described, as it is obvious that any qualified engineer may modify the details to an indefinite extent without departing from the spirit of the invention.

We desire it to be understood that we lay no claim to the pulleys *per se*, composed of the two coned disks 4 and 5, or the form of belt employed.

Having now described our invention, what we claim as new, and desire to secure by Letters Patent, is—

1. In combination in a speed-varying belt mechanism and with a pair of coaxial bevel-faced disks mounted upon a common shaft, sliding screw-sleeves coaxial with the said shaft and connected to actuate the said disks, and an adjusting-screw coöperating with the said screw-sleeves for adjusting them, substantially as set forth.

2. In combination in a speed-varying belt mechanism and with a pair of coaxial bevel-faced disks mounted upon a common shaft, sliding screw-sleeves coaxial with the said shaft and connected to actuate the said disks, means for preventing the rotation of said sleeves, and an adjusting-screw for relatively adjusting at least one of them axially to and from the other, substantially as set forth.

In witness whereof we have hereunto set our hands in presence of two witnesses.

CHRISTOPHER HERBERT OLIVERSON.
FRANCIS WILLIAM KILLINGBECK.

Witnesses:
ARTHUR HOLT,
JAMES WILKINSON.